US008787880B2

(12) United States Patent  (10) Patent No.: US 8,787,880 B2
Doyle  (45) Date of Patent: Jul. 22, 2014

(54) WIRELESS DEVICE CACHING DATA PROXY

(75) Inventor: Thomas Francis Doyle, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 1270 days.

(21) Appl. No.: 11/763,164

(22) Filed: Jun. 14, 2007

(65) Prior Publication Data

US 2008/0313284 A1 Dec. 18, 2008

(51) Int. Cl.
- *H04M 1/725* (2006.01)
- *H04W 4/00* (2009.01)
- *H04W 36/00* (2009.01)
- *H04B 7/212* (2006.01)
- *H04J 3/06* (2006.01)
- *H04L 12/28* (2006.01)
- *G06F 15/16* (2006.01)

(52) U.S. Cl.
USPC ............ 455/412.1; 455/432.1; 455/434; 455/436; 370/324; 370/350; 370/390; 370/278; 370/276; 709/248; 709/217; 709/212

(58) Field of Classification Search
USPC ............ 455/412, 432.1, 434, 436–444; 370/324, 350, 503, 395.21, 390, 276, 370/277, 278, 282; 709/248, 217, 212
See application file for complete search history.

(56) References Cited

U.S. PATENT DOCUMENTS

| | | | | |
|---|---|---|---|---|
| 6,108,554 A * | 8/2000 | Kawamoto | | 455/456.5 |
| 7,243,123 B1 * | 7/2007 | Allen et al. | | 709/204 |
| 2002/0087674 A1 * | 7/2002 | Guilford et al. | | 709/223 |
| 2004/0121784 A1 * | 6/2004 | Park et al. | | 455/456.1 |
| 2004/0218575 A1 * | 11/2004 | Ibe et al. | | 370/338 |
| 2005/0021622 A1 * | 1/2005 | Cullen | | 709/204 |
| 2005/0037787 A1 * | 2/2005 | Bachner et al. | | 455/502 |
| 2005/0203682 A1 * | 9/2005 | Omino et al. | | 701/24 |
| 2006/0018270 A1 * | 1/2006 | Forand et al. | | 370/324 |
| 2006/0234743 A1 | 10/2006 | Fritsch et al. | | |
| 2007/0070931 A1 * | 3/2007 | Lewis et al. | | 370/328 |

FOREIGN PATENT DOCUMENTS

| | | |
|---|---|---|
| EP | 1401176 A2 | 3/2004 |
| EP | 1575218 | 9/2005 |
| EP | 1655914 | 5/2006 |
| WO | 03083691 A1 | 10/2003 |
| WO | 2005000437 A2 | 1/2005 |

OTHER PUBLICATIONS

Partial International Search Report—PCT/US08/064418—International Search Authority, European Patent Office—Oct. 2, 2008.
International Search Report, PCT/US2008/064418, International Search Authority—European Patent Office, Mar. 25, 2009.
Written Opinion of the International Searching Authority, PCT/US2008/064418, International Search Authority—European Patent Office, Mar. 25, 2009.

* cited by examiner

*Primary Examiner* — Jinsong Hu
*Assistant Examiner* — Dung Hong
(74) *Attorney, Agent, or Firm* — Arent Fox LLP

(57) ABSTRACT

A wireless device is provided to act as a caching data proxy for a first device, which may or may not be wireless. In particular, a cellular telephone is associated as a caching data proxy for a wireless portable computing device. The cellular telephone caches data as a proxy for the portable computing device when the portable computing device is either out of network coverage, powered down, or the like.

19 Claims, 4 Drawing Sheets

WIRELESS DEVICE CACHING DATA PROXY

BACKGROUND

1. Field

The present application relates to a blended wireless data processing system and, more particularly, to using one wireless device as a caching data proxy for another wireless device.

2. Background

In today's work environment, the average worker has access to numerous wireless devices. For example, many workers have ready access to cellular telephones, two way radios, wireless portable computers, handheld computing devices, PDAs, BLACKBERRYs®, provided by Research in Motion Limited, pagers, and the like. The wireless devices allow a worker to access company, network, or internet based applications so the worker can continue working and using those resources while traveling, moving from place to place, or otherwise not at a wired workstation.

In some cases, the worker's wireless tools may include a wireless portable computer or computing device as well as other wireless devices, such as, a cellular telephone. Today's cellular telephones have wide area coverage and frequently include numerous features that allow it to access company, network, and internet resources. However, the portable computer typically has more computing power, is faster, has a better display, an easier to manipulate keyboard, and the like making it more desirable to work from the portable computer rather than even the most sophisticated cellular telephone. Moreover, cellular telephones frequently are not sufficiently configured to use all the applications a mobile worker may need to access. Thus, for many individuals in both personal and professional environments, the portable computer is a more desirous computing device.

However, while the wireless portable computer is a preferable and typically a more powerful computing solution, the wireless portable computer is often not turned on, for example, to save battery power during travel, or out of the network coverage area. Thus, worker's cannot access some company or network available resources, and the worker may miss important application packet delivers from the company or network resources. Thus, it would be desirous to provide a wireless computing solution that addresses these and other problems.

SUMMARY

To attain the advantages of and in accordance with the purpose of the present computing system, a method for receiving data over a wireless computing network is provided. The method includes the steps of obtaining a data communication destined for a first wireless device and determining whether the first wireless device is connected to a first wireless computing network. The first wireless device may not be connected to the first wireless computing network because it is either out of coverage area, powered down, or the like. If it is determined the first wireless device is not connected to the first wireless computing network, a determination is made whether a second wireless device is associated with the first wireless device and, if so, is it connected a second wireless computing network. If it is determined the second wireless device is connected to the second wireless computing network, the data communication is transmitted to the second wireless device to cache the data as a proxy for the first device.

The present computing system further provides method for transmitting data communication over a wireless computing network from a first wireless device. The method includes the steps of generating a data communication originating from a first wireless device to be sent to a server or a separate wireless device. First, it may be determined whether the first wireless device is connected to a first wireless computing network. If the first wireless device is not connected, it is determined whether a second device is associated with the first wireless device. In the instance where a second wireless device is always associated with the first wireless device, the answer to this determination is always yes or eliminated. Once a second device is established, it is determined whether the second wireless device is connected a second wireless computing network and, if it is connected, the second wireless device transmits the data communication.

The present system further provides a wireless device. The wireless device including a first device, whether or not wireless, and a second wireless device. The second wireless device is connected to a server over a wireless network. The second wireless device receives power independent of whether the first device receives power. A link between the first device and the second wireless device transfers at least one communication between the first device and the second wireless device, wherein at least one communication destined for the first device is received by the second wireless device and transmitted from the second wireless device to the first device over the link when the first device is powered.

The present system further provides a wireless device. The wireless device including a first device, whether or not wireless, and a second wireless device. The second wireless device connects to a server over a wireless network. The second wireless device receives power independent of whether the first device receives power. A link between the first device and the second wireless device transfers at least one communication from the first device to the second wireless device, wherein at least one communication generated from the first device is received by the second wireless device and transmitted from the second wireless device when the second wireless device is in coverage of the wireless network regardless of whether the first device is powered.

The foregoing and other features, utilities and advantages of the device and system will be apparent from the following more particular description of a preferred embodiment of the invention as illustrated in the accompanying drawings.

BRIEF DESCRIPTION OF THE DRAWINGS

The features, objects, and advantages will become more apparent from the detailed description set forth below when taken in conjunction with the drawings in which like reference characters identify correspondingly throughout and wherein.

DETAILED DESCRIPTION

A computing system will now be described, with reference to the figure. While the below description generally describes a wireless laptop computer and a cellular telephone, one of ordinary skill in the art on reading the disclosure would now recognize that the present invention could be used with multiple wireless devices in multiple environments. For example, the wireless computing device or cellular telephone could be replaced with any number of wireless devices that transmit data between units, including for example, pagers, two-way radios, PDAs, BLACKBERRYs®, electronic games, hand-held computers, navigation units, positioning devices, iPODs® from Apple Computer, MP players, DVD players, CD players, and the like. Moreover, system is described with particular reference to accessing an electronic mail system using the portable computer, but one of ordinary skill in the art will recognize on reading the disclosure that other company applications or network resources may be substituted for the described electronic mail application.

Figure 1:
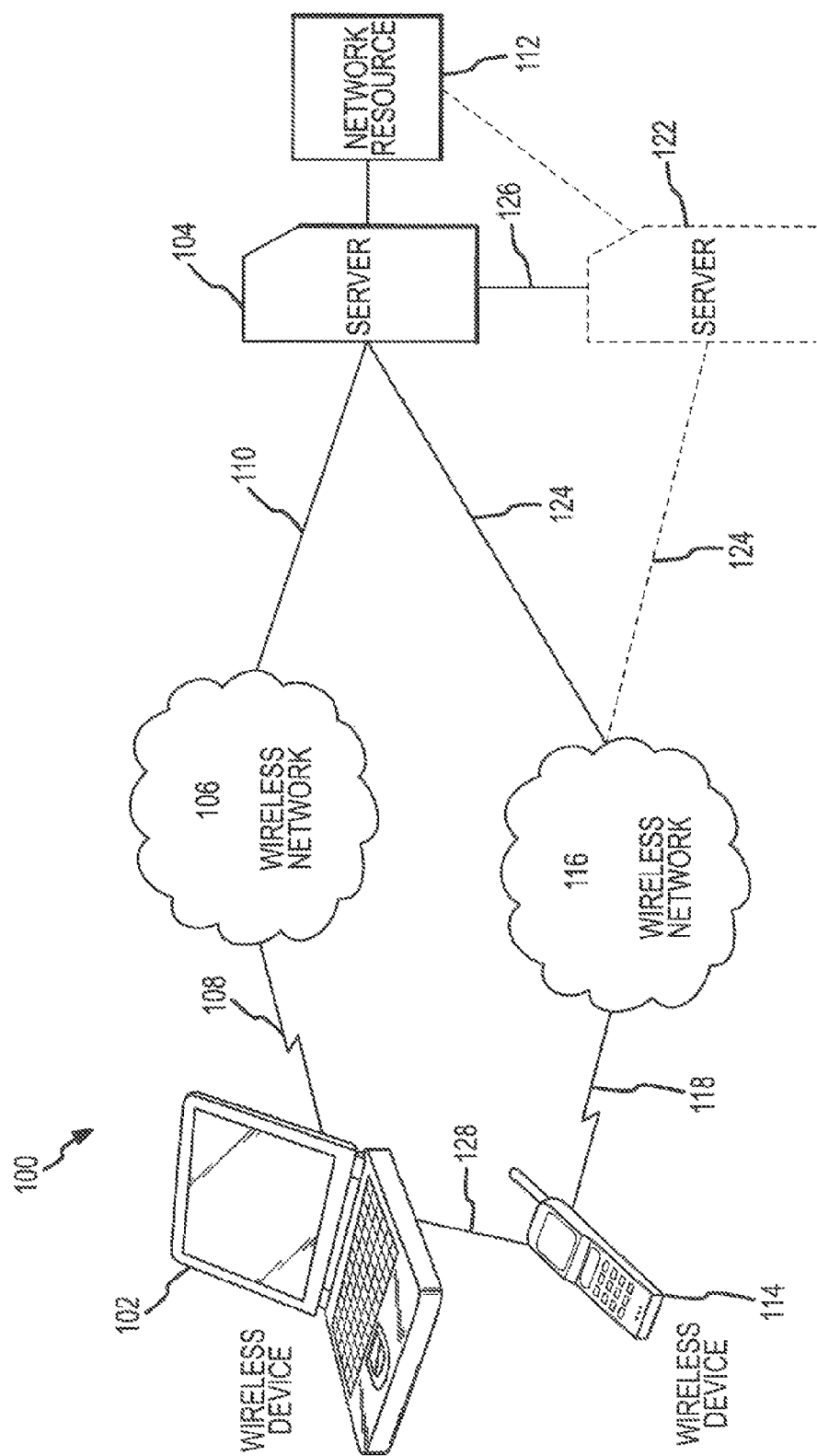
FIG. 1 is a block diagram of a wireless data computing system.

Referring to FIG. 1, a block diagram of a computing system 100 is shown. Computing system 100 includes a first wireless device 102, which in this case is shown as a portable computer, but could be any type of wireless device, connected to a server 104, which could be a company server or a public server, over a wireless network 106. Wireless network can be any conventional wireless network, such as, for example, WLANs, WiFi, Broadband, cellular networks, satellite networks, or the like whether digital or analog. Wireless device 102 is connected to wireless network 106 over communication link 108. Wireless network 106 is connected to server 104 over a wired or wireless communication link 110. Server 104 may connect to other network resources 112, such as, for example, email servers, printers, voice applications, or the like as needed. Network resources 112 may be incorporated in server 104 or be accessible through a network, such as, for example, a LAN, WAN, WLAN, WiFi, the Internet, an Ethernet, or the like. Data is exchanged between server 104 or network resource 112 and wireless device 102 in a conventional manner.

Figure 2:
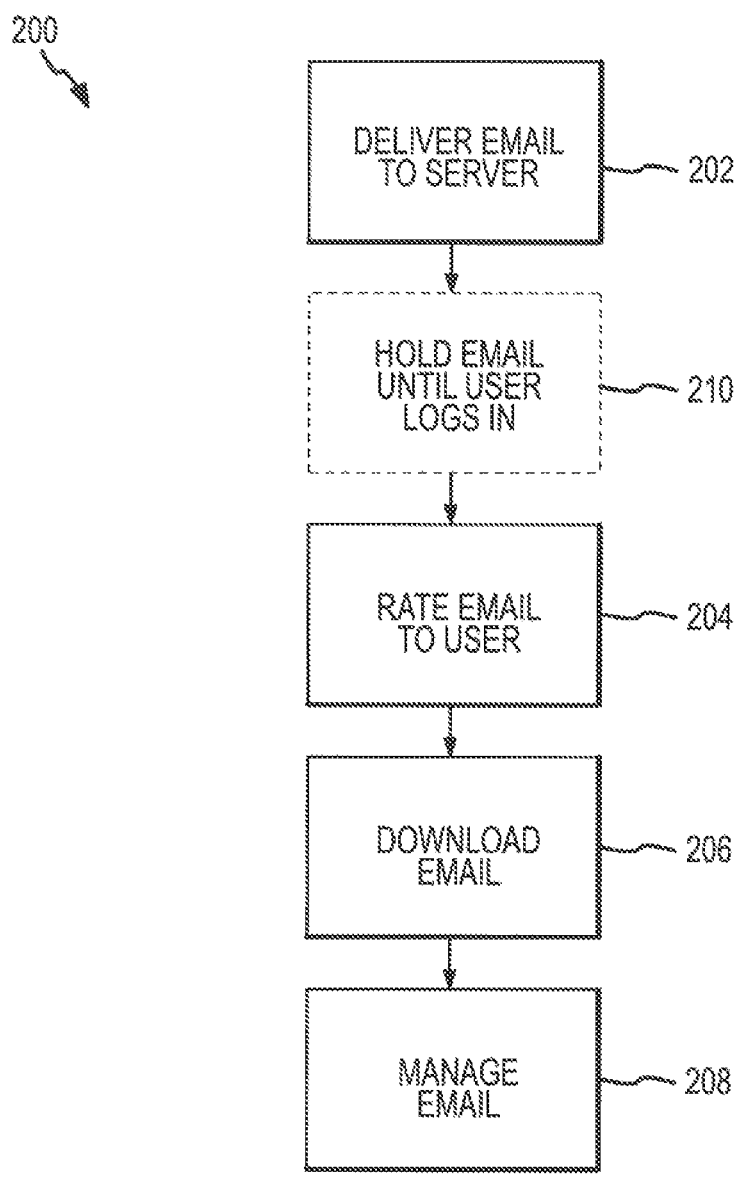
FIG. 2 is a flowchart illustrating receiving a data packet using the system of FIG. 1.

For example, referring to FIG. 2, a flowchart 200 describes an overview process for delivering an electronic mail message to wireless computing device 102. Flowchart 200 is provided for completeness, but the specifics of electronic mail transfer, delivery, and management are generally understood in the art and not described herein for convenience. For this example, network resource 112 will be considered an email server, but server 104 or other resources may incorporate the email server. First, an electronic message is delivered to the email server for the user at wireless device 102, step 202, Assuming the user is logged in and connected to the email server, the email server routes the electronic message to the wireless device, step 204, and the wireless device downloads the message, step 206. The user of wireless device can view or manage the message as desired, step 208. If the user is not logged in or connected to server 104, the email server holds the message until the user logs onto the system, step 210 (shown in phantom), at which time the message or a notification is delivered to the user as generally described above. Management of the email between the server and the wireless device may be accomplished in any number of generally know methodologies. Moreover, instead of email, other network resources could be accessed over the bi-directional communication finks available between wireless device 102 and server 104 as well as associated network resources 112. For example, wireless device 102 could send a data packet to server 104 for processing by an application accessible by server 104. Once the data packet is processed, server 104 would return the processed data back to wireless device 102.

The above described portion of system 100 works reasonably well when the wireless device is powered, located in a coverage area, and logged into the system. However, wireless device 102 may be powered down for much of the time. For example, if wireless device 102 is a laptop computer, a worker would typically have the computer powered down while traveling. In some situation, for example, in more rural areas of the country, the laptop computer may only be powered when the computer is out of a coverage area. In these cases, data to be transmitted to (or from) wireless data 102 to server 104 needs to be saved for eventual transmission. Thus, it may be a significant amount of time prior to data is transferred between wireless device 102 and server 104. In the email example above, urgent messages to the user of device 104 may be delayed because the wireless device is not powered and logged into the system for lengthy periods.

Referring back to FIG. 1, most users of wireless device 102 have a second wireless device 114. In this example, second wireless device is a conventional cellular telephone, but may be any number of wireless devices including all the devices identified with respect to wireless device 102, above. While second wireless device 114 may be connected to server 104 through wireless network 106, second wireless device 114 is shown connected to server 1(54 through wireless network 116. Wireless communication link 118 connects second wireless device 114 to wireless network 116 and communication link 120, which may be wired or wireless, connects server 104 to wireless network 116. Even if second wireless device 114 uses the same network as first wireless device, second wireless device may either be powered or in coverage more often than first wireless device because of, for example, lower overall power requirements, better battery life, better radio frequency profile, better antenna, better line of sight with the network, or the like. Notice, shown in phantom, second wireless device 114 may be connected to a separate server 122 via communication link 124, which may be wired or wireless, associated with second wireless device 114. In this case, server 104 and server 122 may be connected by communication link 126, which may be a data link, a wireless connection, a wired connection, a network connection, or the like. Server 122 may be connected to resources 112 similar to server 104. Second wireless device 114 is connectable or connected to first wireless device 102 via communication link 128. Communication link 128 can be a wireless connection, wired connection, a port, or the like. Moreover, second wireless device 114 may be integrated into first wireless device 102 but it is envisioned as a separate unit.

Using the example of the computing device as first wireless device 102 and a cellular telephone as the second wireless device 114, one of ordinary skill in the an will now recognize that second wireless device 114 is typically powered. The second wireless device 114 being typically on allows, for example, server 104 to push data from not typically available with first wireless device 102 as the first wireless device is typically powered off. For example, server 104 could send a SMS message to second wireless device 114 that data, such as an email, is available for first wireless device 102. Second wireless device 114 could check server 104 for the data, such as the email, obtain the data, and send it to the first wireless device 102.

Figure 3:
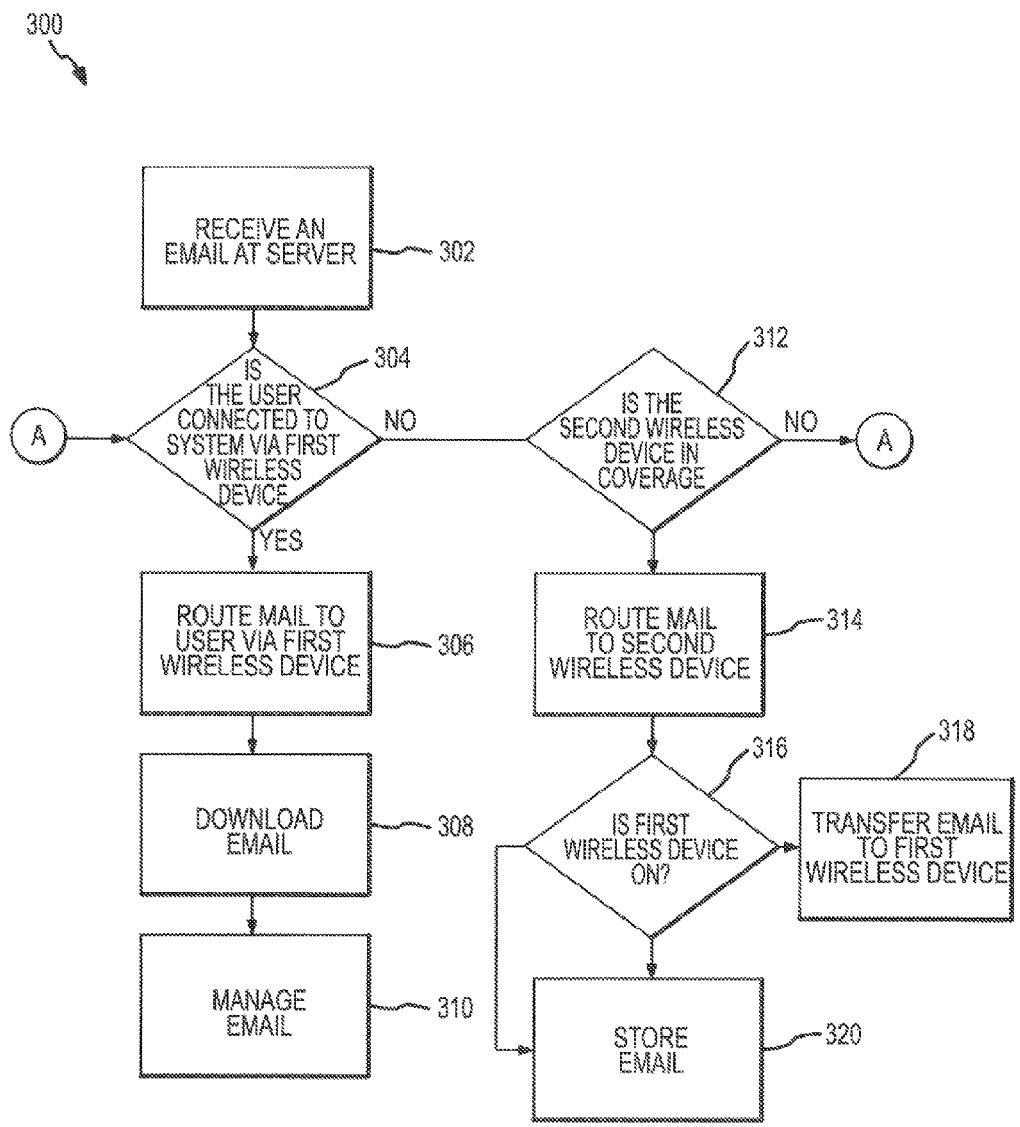
FIG. 3 is a flowchart illustrating receiving a data packet using the system of FIG. 1.

Referring now to FIG. 3, a flowchart 300 is shown for delivering an electronic message or email, including the situation where first wireless device 102 is unavailable as described above. First, an electronic message for the user of first wireless device 102 is received at an email server, step 302. Next, it is determined whether the user of first wireless device 102 is connected or logged into the electronic message or email system, step 304. For purposes of this example, first wireless device 102 is considered the primary email processor or computer. Notice, the user may not be logged onto the system because the first wireless device is powered down, the first wireless device is outside the network coverage area, or some combination thereof. If the user is logged onto the system, the email message is routed to the user, step 306, downloaded to wireless device 104, step 308, and managed in a generally know method, step 310.

If it is determined that the user of first wireless device 102 is not connected to the email system, it is next determined whether second wireless device 114 is within network coverage, step 312. If second wireless device 114 is not within network coverage, control returns to step 304. If it is determined second wireless device 114 is within network coverage, the email is routed to second wireless device 114, step 314. Next, second wireless device 114 checks if first wireless device 102 is powered, step 316, if first wireless device 102 is powered, second wireless device 114 may immediately transfer the email to first wireless device, step 318. If first wireless device is not powered, second wireless device 114 may store the email in a memory, step 320. If second wireless device 114 is out of network, the system optionally may check periodically, continually, or randomly whether first wireless device 102 or second wireless device 114 is in network for delivery of pending data transmissions.

Notice, whiles server 104 is described as determining whether first or second device is connected or logged to the appropriate system, the rules could be established for server 104 to always send the data over one or the other path. For example, server 104 may always send the data packets to second wireless device 114 because it is more probable that second wireless device has the appropriate connectivity. In this example, second wireless device 114 is a cellular telephone and it is more likely that second wireless device 114 can receive the data whether first device 102, a personal computer for example, is or is not in network.

FIG. 3 describes a situation where second wireless device 114 is simply used as an alternative communication pathway for primary email client, which in this example is first wireless device 102. In some cases, second wireless device 114 may be configured with application program similar to the first wireless device 102 to use the transferred data. For this example, second wireless device 114 may include the application software to manage and view the email account. In this case, server 104 would simply deliver the email to the wireless device available for processing the email or data. Business rules between first wireless device 102 and second wireless device 114 would be used to synchronize the data between the system, similar to, for example, conventional business rules between PDAs, BLACKBERRIES, and personal computers, and the like.

Figure 4:
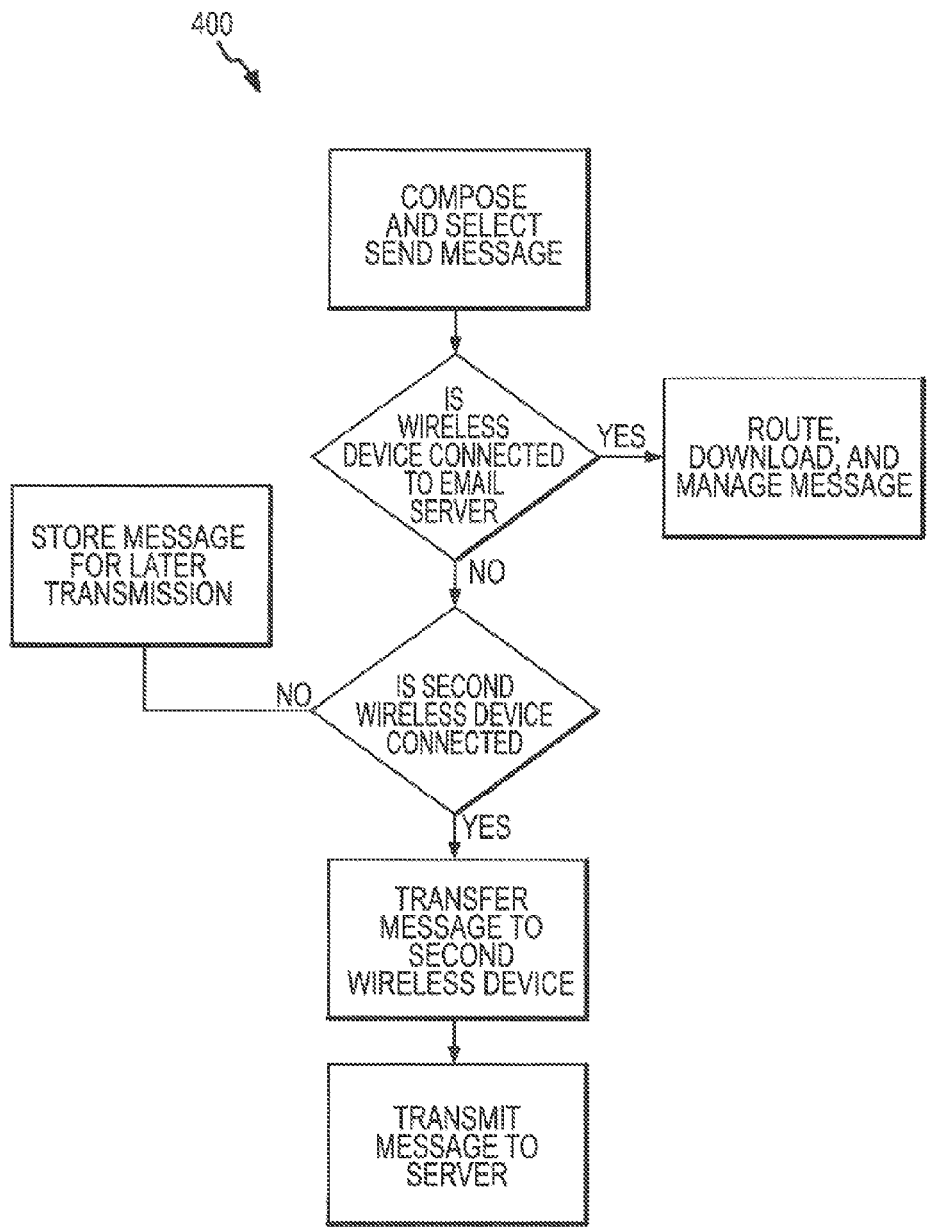
FIG. 4 is a flowchart illustrating sending a data packet using the system of FIG. 1.

Referring now to FIG. 4, a flowchart 400 shows a methodology for sending an electronic message from first wireless device 102. First, a user of wireless device 102 would compose an email and select the send message option, step 402. Wireless device 102 would next determine whether it is connected to the email server through wireless network 106, step 404. If connected, wireless device 104 transmits the message to the server for message routing, downloading, and management in a generally known manner, if wireless device 104 is not connected to the server, wireless device next determines whether associated second wireless device 114 is connected to its network 116, step 406. If the second wireless device 114 is not connected to the network, the composed message is saved for later transmission, step 408.

As mentioned above, the system may elect to always send the data to second device 114 for transmission because second device 114 is more likely to have an established communication path. Moreover, when neither device is currently connected, the message could be saved in first wireless device for later transmission, could be transmitted to second wireless device 114 and saved for eventual transmission, both devices could attempt to transmit the data with business rules being established to inhibit both devices from sending the data (in other words, if first device transmits the data, it would send an update to second device to indicate the data has been transmitted and the second device no longer needs to send the data). Additionally, in the event that duplicate data packets are send over the two networks, business rules should allow the system to dismiss duplicate data. Regardless, the system should send the message over the first available network. Moreover, and optionally, unsent messages stored in first wireless device may be transferred to second wireless device for storage and transmission if first wireless device is powered down while first wireless device remains out of network.

If second wireless device is connected to its associated network, first wireless device 102 transfers the messages to second wireless device 114, step 412. Second wireless device transmits the messages to the email server over its associated network 116. Once at the email server, the message is routed, downloaded, and managed in a generally known manner.

The above devices are described where both devices have wireless network connections. But, first wireless device 102 may not have any wireless connectivity. In this case, second wireless device 114 provides the only available wireless communication path. The asynchronous and caching ability of the second wireless device 114 to provide connectivity and hold data for when first wireless device 102 is powered is different than simply using the phone as a modem. When the first device, for example, is not provided with connectivity, flowcharts 300 and 400 either always answer the question of whether the first device is connected in the negative or simply eliminate the steps associated with the first device having connectivity, While the above system has been described with reference to electronic messages or email, one of ordinary skill in the art on reading the disclosure will now recognize other data transmissions are possible including discrete data packets or steamed connections. Thus, first wireless device 102 may receive or send video or audio streams (as well as other data transmissions, still images, MPs, MPEGs, etc) from network resources 112 via second wireless device 114, wireless network 116, and the data link 128 between the two. Similarly, a person using second wireless device 114 may receive or send data via first wireless device 102, network 106, and the data link 128 between the two.

Moreover, with appropriate programming, first wireless device in a network coverage area may elect to send data over second wireless and its associated network because the signal strength is greater or the traffic on the network associated with the second wireless device is lower.

Use of the second, associated wireless device to receive, transmit, and store data as a proxy for the first wireless device can cause duplication of system resources potentially. To avoid the duplication or waste of resources, many business rules would need to be established for various contingencies. Such rules are largely a matter of design choice. For example, if an email server transmits an email message to the second wireless device as a proxy for the first wireless device, should the email server retain the message or tag the message as delivered. If retained, should the email server tag the message as delivered if a notification is received from the first wireless device that the message was received or on a notification from the second wireless device that the message was delivered. Moreover, in the example of the cellular phone and laptop computer, should the cellular phone return any messages or communications to the server if the messages or communications have not been delivered when it is powered down. These and other situations can be controlled through various rules engines. The rules engines are generally known in the art and any rules solution can be used as a matter of system design choice.

While the blended computing system has been particularly shown and described with reference to an embodiment thereof, it will be understood by those skilled in the art that various other changes in the form and details may be made without departing from the spirit and scope of the application.

What is claimed is:

1. A method for communicating data over a wireless computing network, comprising:
   obtaining, by a server, a data communication destined for a first wireless device;
   determining whether the first wireless device is connected to the server via a first wireless computing network independently of a second wireless device, wherein the second wireless device is associated with the first wireless device;
   if it is determined the first wireless device is not connected to the server via the first wireless computing network, determining whether the second wireless device is connected to the server via a second wireless computing network;
   if it is determined the second wireless device is connected to the server via the second wireless computing network, transmitting the data communication to the second wireless device for delivery to the first wireless device,
   wherein when the determination is made that the second wireless device is not connected to the server via the second wireless computing network and that the first wireless device is not connected to the server via the first wireless computing network, then periodically checking both whether the second wireless device is connected to the server via the second wireless computing network and whether the first wireless device is connected to the server via the first wireless computing network independently of the second wireless device;
   selecting, by the server, whether to send the data communication to the first wireless device over the first wireless computing network or the second wireless computing network, via the second wireless device, if it is determined that the first wireless device is connected to the server via the first wireless computing network independently of the second wireless device, and via the second wireless computing network via the second wireless device,
   wherein selecting the first wireless computing network or the second wireless computing network is based on traffic over the first wireless computing network and the second wireless computing network; and
   transmitting the data communication via the second wireless computing network via the second wireless device when a determination is made that that the traffic over the second wireless computing network is lower than the first wireless computing network, else transmitting the data communication via the first wireless computing network.

2. The method of claim 1, wherein the obtaining further comprises receiving the data communication from a third party.

3. The method of claim 1, wherein the transmitting of the data communication to the second wireless device is for immediate download to the first wireless device.

4. The method of claim 1, wherein the transmitting to the second wireless device is for storing the data communication only until the data communication is downloaded to the first wireless device.

5. The method of claim 1, wherein the first wireless computing network and the second wireless computing network are the same.

6. The method of claim 1, wherein the first wireless computing network and the second wireless computing network are different.

7. The method of claim 1, wherein the data communication comprises electronic mail.

8. The method claim 1, wherein the data communication is selected from a group of data consisting of: video, audio, audio/video, text or images.

9. The method of claim 1, further comprising holding the data communication until at least one of the first wireless device and the second wireless device are connected to the server via at least one of the first wireless computing network or the second wireless computing network.

10. The method of claim 1, wherein selecting the first wireless computing network or the second wireless computing network is further based on a strength of a network signal.

11. A method for communicating data communication over a wireless computing network, comprising:
    generating, by a first wireless device, a data communication originating from the first wireless device;
    determining, by the first wireless device, whether the first wireless device is connected to a server via a first wireless computing network independently of a second wireless device associated with the first wireless device;
    if it is determined the first wireless device is not connected to the server via the first wireless computing network independently of the second wireless device, determining, by the first wireless device, whether the second wireless device is connected to the server via a second wireless computing network;
    if it is determined the second wireless device is connected to the server via the second wireless computing network, transmitting the data communication from the first wireless device to the second wireless device for transmitting to the server;
    selecting whether to send the data communication from the first wireless device over the first wireless computing network or the second wireless computing network if it is determined that the first wireless device is connected to the server via the first wireless computing network independently of the second wireless device or via the second wireless computing network via the second wireless device,
    wherein selecting the first wireless computing network or the second wireless computing network is based on traffic over the first wireless computing network and the second wireless computing network;
    transmitting the data communication via the first wireless computing network when a determination is made that the first wireless device is connected to the server via the first wireless computing network independently of the second wireless device; and
    transmitting an update message to the second wireless device to inhibit the second wireless device from transmitting the data communication to the server via the second wireless network.

12. The method of claim 11, wherein on turning off the first wireless device, it is determined whether at least one data communication exists for transmission that has not been transmitted and transferring the at least one data communication to the second wireless device to be transmitted over the second wireless computing network.

13. The method of claim 11, wherein the first wireless computing network and the second wireless computing network are different.

14. The method of claim 11, wherein the data communication includes requesting return of processed data.

15. The method of claim 11, wherein the data communication comprises electronic mail.

16. The method of claim 15, wherein the data communication is selected from a group of data consisting of: video, audio, audio/video text, or images.

17. The method of claim 11, further comprising transmitting the data communication over the second wireless computing network when a determination is made that the traffic over the second wireless computing network is lower than the first wireless computing network, else transmitting the data communication via the first wireless computing network.

18. A method for communicating data over a wireless computing network, comprising:
    receiving, at a second device, generated data originating from a first device in response to the first device detecting that traffic over a second wireless computing network associated with the second device is lower than traffic over a first wireless computing network, the second device being a wireless device associated with the first device;
    determining whether the second device is connected to the second wireless computing network;
    if it is determined the second device is connected to the second wireless computing network, transmitting the data;
    if it is determined the second device is not connected to the second wireless computing network, storing the data and repeating the determining whether the second device is connected to the second wireless computing network until the data is transmitted;
    determining whether an update message is received from the first device; and
    inhibiting the second device from transmitting the data communication to the server via the second wireless network when a determination is made that an update message is received.

19. The method of claim 18, wherein transmitting the data comprises transmitting the data to a server via the second wireless computing network.

* * * * *